(12) United States Patent
Brikman et al.

(10) Patent No.: US 11,514,400 B2
(45) Date of Patent: *Nov. 29, 2022

(54) APPLYING FOR A JOB USING A MOBILE COMPUTING DEVICE

(71) Applicant: Microsoft Technology Licensing, LLC, Redmond, WA (US)

(72) Inventors: Yevgeniy Brikman, Menlo Park, CA (US); Praveen Neppalli Naga, Union City, CA (US); Vikram Rangnekar, Saratoga, CA (US); Rudolph Jakob Heuser, Redwood City, CA (US); Michael D. Repass, San Francisco, CA (US); Anmol Bhasin, Los Altos, CA (US); Jonathan Wyatt Seitel, San Francisco, CA (US); Adam Nash, Los Altos, CA (US); Hemendra Kumar, Mountain View, CA (US); Shernaz R. Pavri, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 168 days.

This patent is subject to a terminal disclaimer.

(21) Appl. No.: 13/907,612

(22) Filed: May 31, 2013

(65) Prior Publication Data

US 2014/0025597 A1  Jan. 23, 2014

Related U.S. Application Data

(63) Continuation of application No. 13/664,328, filed on Oct. 30, 2012, now abandoned.
(Continued)

(51) Int. Cl.
G06Q 10/10 (2012.01)
G06Q 50/00 (2012.01)

(52) U.S. Cl.
CPC ........ G06Q 10/1053 (2013.01); G06Q 10/10 (2013.01); G06Q 50/01 (2013.01)

(58) Field of Classification Search
CPC ........................ G06Q 10/1053; G06Q 50/01
(Continued)

(56) References Cited

U.S. PATENT DOCUMENTS

| 2003/0163403 A1* | 8/2003 | Chen ..................... G06Q 40/06 705/36 R |
| 2005/0015392 A1 | 1/2005 | Tonkin |

(Continued)

OTHER PUBLICATIONS

Taylor, Collen: "Exclusive: LinkedIn to Launch Job Application Tool." Gigaom, Jun. 1, 2011, www.gigaom.com/2011/06/01/apply-with-linkedin/?utm_source=social&utm_medium=twitter&utm_campaign=gigaom pp. 1-9.*
(Continued)

Primary Examiner — Gabrielle A McCormick
Assistant Examiner — Maame Ofori-Awuah
(74) Attorney, Agent, or Firm — Schwegman Lundberg & Woessner, P.A.

(57) ABSTRACT

Systems and methods for displaying a user interface object associated with a job candidate's social networking site proximate to a job listing presented by a website are described. When a job candidate selects the user interface object, the systems and methods identify and/or obtain information associated with the job candidate that is located or otherwise stored at the social networking site of which the job candidate is a member. Once the information is identified and/or obtained, the systems and methods provide the information to the website, such as to a job application submission system associated with the website.

20 Claims, 11 Drawing Sheets

Related U.S. Application Data

(60) Provisional application No. 61/672,578, filed on Jul. 17, 2012.

(58) Field of Classification Search
USPC .............................. 705/8; 707/749; 709/205
See application file for complete search history.

(56) References Cited

U.S. PATENT DOCUMENTS

| | | | | |
|---|---|---|---|---|
| 2005/0216300 | A1* | 9/2005 | Appelman | H04L 65/403 |
| | | | | 705/26.1 |
| 2006/0265269 | A1 | 11/2006 | Hyder et al. | |
| 2009/0150166 | A1* | 6/2009 | Leite | G06Q 10/105 |
| | | | | 705/320 |
| 2009/0228297 | A1* | 9/2009 | McGovern | G06Q 10/10 |
| | | | | 705/320 |
| 2010/0324970 | A1 | 12/2010 | Phelon et al. | |
| 2011/0196802 | A1 | 8/2011 | Ellis et al. | |
| 2011/0238591 | A1* | 9/2011 | Kerr | G06Q 10/06 |
| | | | | 705/321 |
| 2011/0276631 | A1* | 11/2011 | Schmitt | 709/205 |
| 2012/0023030 | A1 | 1/2012 | Jeffries | |
| 2012/0095931 | A1* | 4/2012 | Gurion | G06Q 10/00 |
| | | | | 705/319 |
| 2012/0166922 | A1* | 6/2012 | Rolles | G06F 16/958 |
| | | | | 715/202 |
| 2012/0215709 | A1* | 8/2012 | Nanda | G09B 7/02 |
| | | | | 705/321 |
| 2012/0265770 | A1* | 10/2012 | Desjardins | G06Q 30/02 |
| | | | | 707/748 |
| 2013/0013526 | A1 | 1/2013 | Le viet et al. | |
| 2013/0097123 | A1 | 4/2013 | Mccolgan et al. | |
| 2013/0290205 | A1 | 10/2013 | Bonmassar et al. | |
| 2014/0025595 | A1 | 1/2014 | Brikman et al. | |

OTHER PUBLICATIONS

Parr Ben. "LinkedIn Launches Button That Lets You Apply for Jobs." Mashable, Jul. 25, 2011, https://mashable.com/2011/07/25/apply-with-linkedin/ (Year: 2011).*

Aijaz, Adil: "The Engineering behand LinkedIn Products 'You May Like'." Official LinkedIn Blog, Mar. 2, 2011, https://blog.linkedin.com/2011/03/02/linkedin-products-you-may-like (Year: 2011).*

"U.S. Appl. No. 13/664,328, Response filed Apr. 28, 2014 to Non Final Office Action dated Jan. 27, 2014", 12 pgs.

"U.S. Appl. No. 13/664,328, Non Final Office Action dated Jan. 27, 2014", 20 pgs.

"U.S. Appl. No. 13/664,328, Non Final Office Action dated Sep. 30, 2014", 22 pgs.

"U.S. Appl. No. 13/664,328, Examiner Interview Summary dated Sep. 3, 2015", 3 pgs.

"U.S. Appl. No. 13/664,328, Final Office Action dated Jun. 15, 2015", 26 pgs.

"U.S. Appl. No. 13/664,328, Response filed Mar. 2, 2015 to Non Final Office Action dated Sep. 30, 2014", 19 pgs.

"U.S. Appl. No. 13/664,328, Response filed Sep. 15, 2015 to Final Office Action dated Jun. 15, 2015", 18 pgs.

"U.S. Appl. No. 13/664,328, Non Final Office Action dated May 15, 2017", 22 pgs.

"U.S. Appl. No. 13/664,328, Examiner Interview Summary dated Mar. 9, 2018", 3 pgs.

"U.S. Appl. No. 13/664,328, Final Office Action dated Nov. 24, 2017", 23 pgs.

"U.S. Appl. No. 13/664,328, Response filed Aug. 15, 2017 to Non Final Office Action dated May 15, 2017", 29 pgs.

"Jobs at Work Market", Retrieved from: https://web.archive.org/web/20111109041615/http://www.workmarket.com/jobs, Nov. 9, 2011, 1 Page.

"Non Final Office Action Issued in U.S. Appl. No. 13/664,328", dated Nov. 16, 2018, 24 Pages.

"Final Office Action Issued in U.S. Appl. No. 13/664,339", dated Jun. 17, 2016, 18 Pages.

"Non Final Office Action Issued in U.S. Appl. No. 13/664,339", dated Jul. 23, 2015, 14 Pages.

"Non Final Office Action Issued in U.S. Appl. No. 13/664,339", dated Jul. 23, 2019, 13 Pages.

"Final Office Action Issued in U.S. Appl. No. 13/664,328", dated May 31, 2019, 26 Pages.

"Final Office Action Issued in U.S. Appl. No. 13/664,339", dated Feb. 6, 2020, 14 Pages.

* cited by examiner

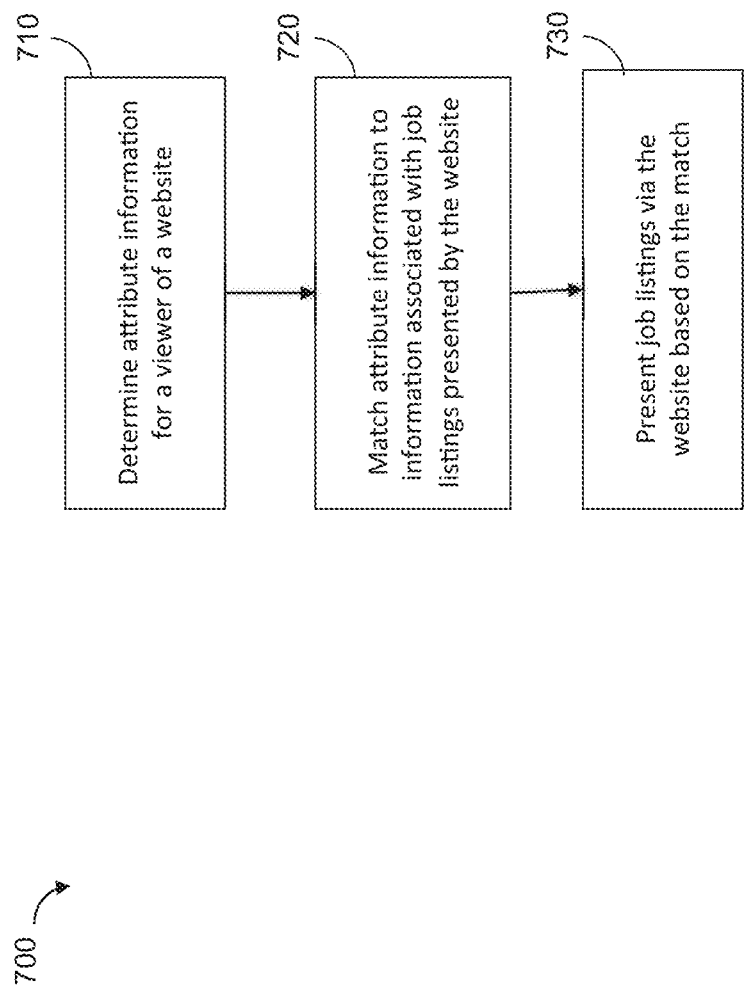

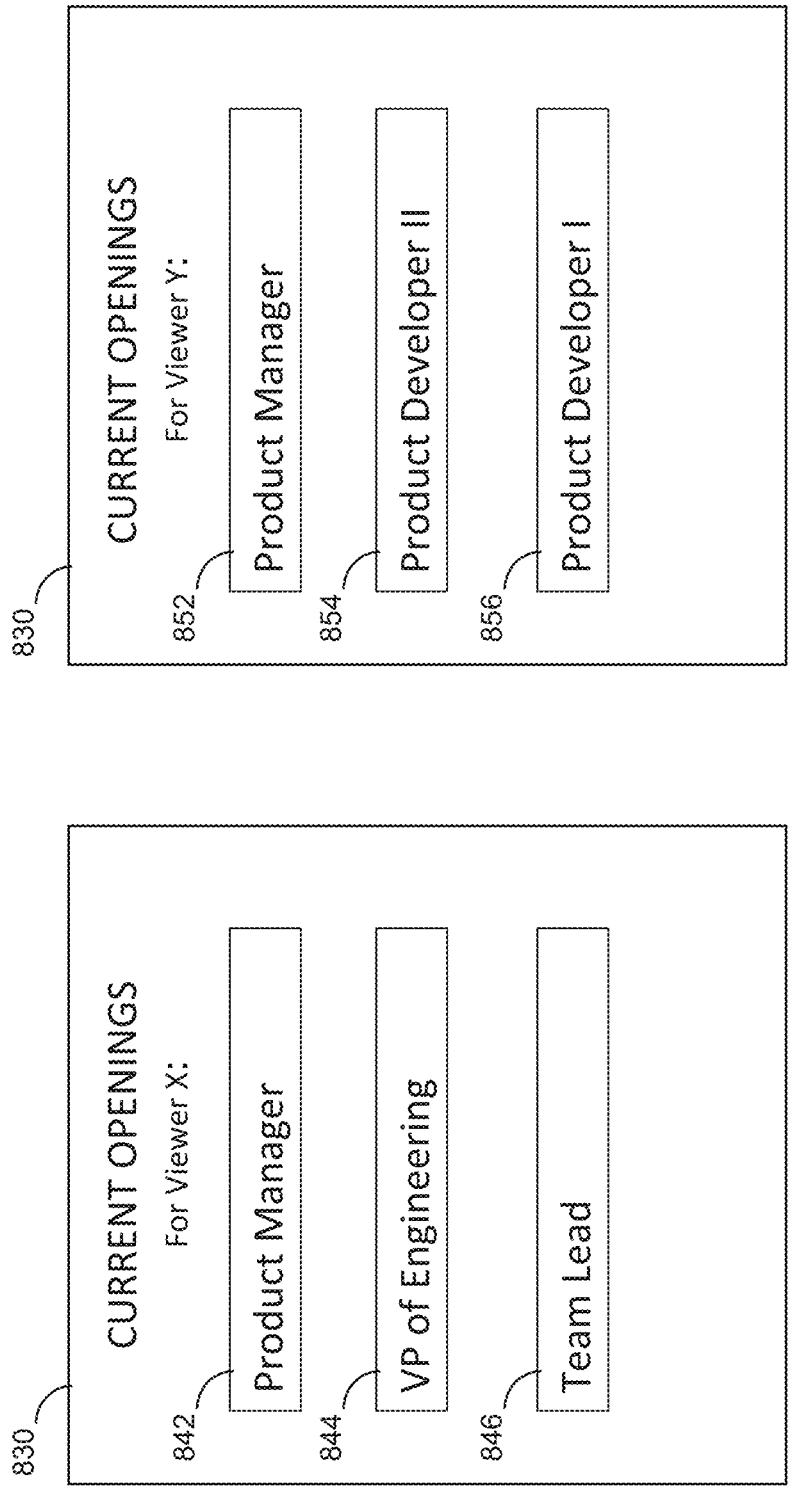

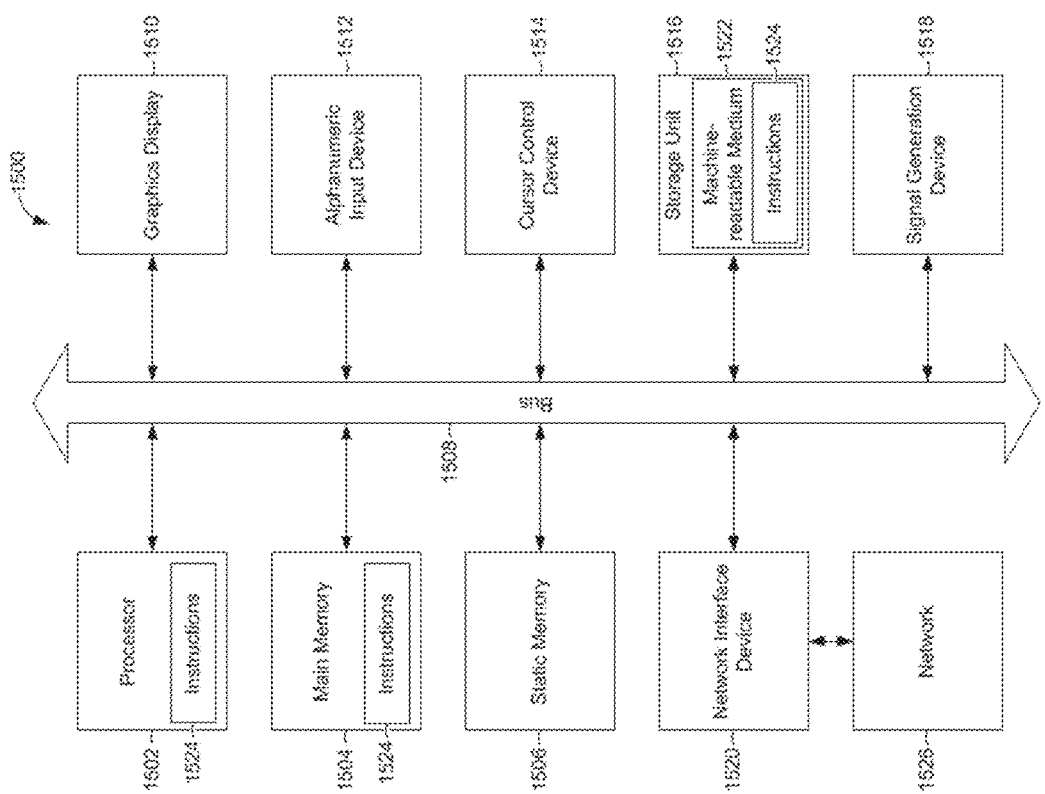

APPLYING FOR A JOB USING A MOBILE COMPUTING DEVICE

CROSS REFERENCE TO RELATED APPLICATIONS

This application is a Continuation of U.S. patent application Ser. No. 13/664,328, filed on Oct. 30, 2012, entitled APPLYING FOR A JOB VIA A WEB PAGE USER INTERFACE OBJECT, which is hereby incorporated by reference in its entirety. This application also claims priority to U.S. Provisional Patent Application No. 61/672,578, filed on Jul. 17, 2012, entitled APPLYING FOR A JOB VIA A WEB PAGE USER INTERFACE OBJECT, which is hereby incorporated by reference in its entirety.

TECHNICAL FIELD

The present disclosure generally relates to providing job application services via websites. More specifically, the present disclosure relates to methods, systems and computer program products for using social network information in job application services.

BACKGROUND

There are many different ways to apply for a job. A candidate may mail or email a cover letter and resume to a company looking to fill a position, may visit a job fair and fill out an application, and/or may submit application materials via a website configured to display available job listings and receive submissions from prospective candidates, among other ways.

DESCRIPTION OF THE DRAWINGS

Some embodiments of the technology are illustrated by way of example and not limitation in the figures of the accompanying drawings, in which:

FIG. 7 is a flow diagram illustrating an example method for displaying job listings via a website, consistent with some embodiments.

FIG. 8B is a display diagram illustrating displayed job listings based on viewers of a website, consistent with some embodiments.

FIG. 9 is a block diagram of a machine in the form of a computing device within which a set of instructions, for causing the machine to perform any one or more of the methodologies discussed herein, may be executed.

DETAILED DESCRIPTION

Overview

Figure 1:
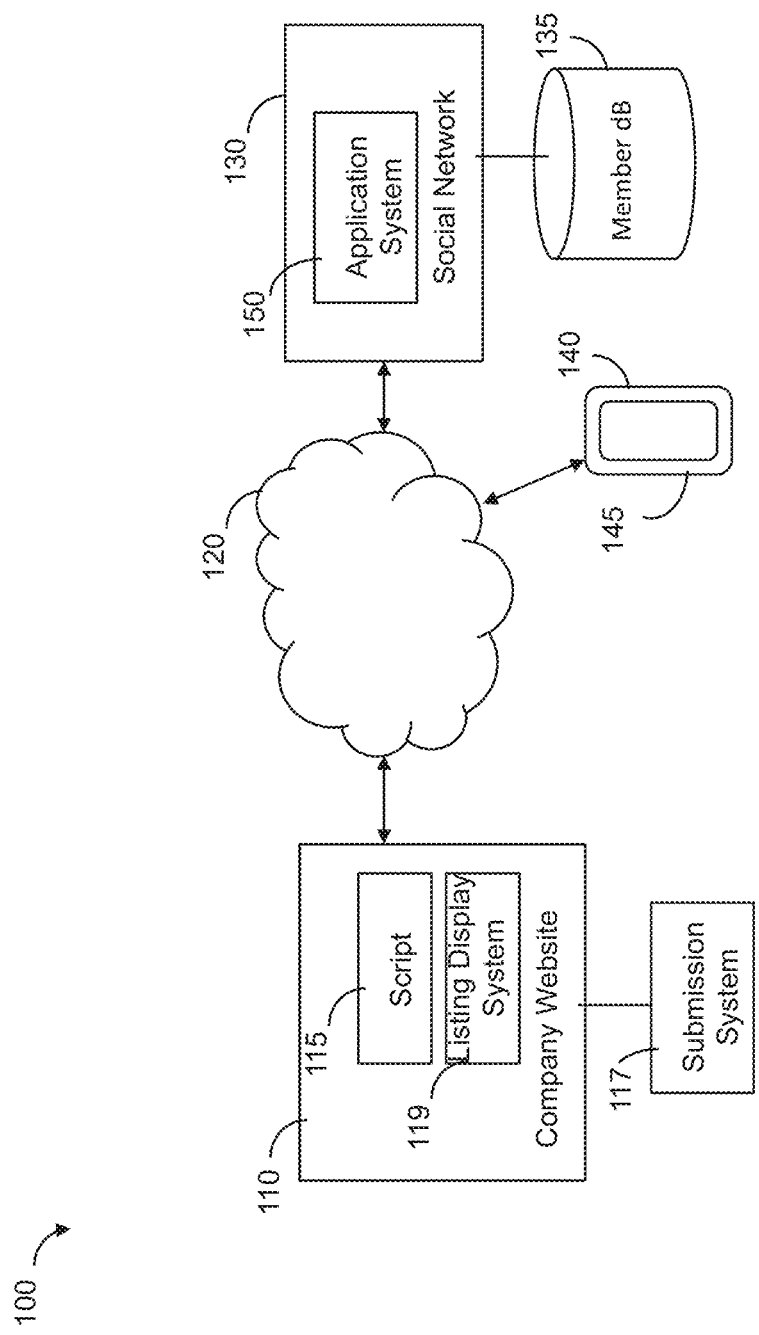
FIG. 1 is a block diagram illustrating an example of a network environment including a server operating a system for providing application information to a website associated with job listings, consistent with some embodiments.

The present disclosure describes methods, systems, and computer program products, which individually provide functionality for providing application materials for a job candidate to a website. In some examples, the systems and methods display a user interface object, associated with a job candidate's social networking site, proximate to a job listing presented by a website. When a job candidate selects the user interface object, the systems and methods identify and/or obtain information associated with the job candidate that is located or otherwise stored at the social networking site of which the job candidate is a member. Once the information is identified and/or obtained, the systems and methods provide the information to the website, such as to a job application submission system associated with the website, effectively applying for a job on behalf of the candidate using information from the candidate's member profile within the social networking site, among other benefits.

For example, the employment page of a large company may display listing information identifying jobs available at the company, along with a user-selectable button that, upon being selected by a job candidate, causes a script running on the website to obtain information associated with the job candidate (e.g., employment information, education information, social graph information, location information, and so on) from a social network that includes the job candidate as a member. The employment page may then present the obtained information to the job candidate for review and approval, may receive additional information from the job candidate (e.g., a cover letter or other document), and submit the obtained and/or received information as application materials on behalf of the job candidate.

In some examples, a website presenting job listings may selectively present job listings and/or user interface objects that facilitate the submission of application materials, based on information associated with a viewer of the website. For example, the website may receive information identifying a viewer and information associated with various attributes for the viewer, and present a modified display of job listings based on the received information.

For example, a job seeker accesses an employment website and searches for jobs via a keyword search of "electrical engineering." Before displaying job listings that satisfy the search, the website obtains information associated with the job seeker, such as via member profile information from a social networking site of which the job seeker is a member, that indicates the job seeker has a PhD in Electrical Engineering, and modifies the displayed job listings by presenting user interface objects that facilitate submitting application materials only next to job listings that require an advanced degree.

In the following description, for purposes of explanation, numerous specific details are set forth in order to provide a thorough understanding of the various aspects of different embodiments of the present invention. It will be evident, however, to one skilled in the art, that the present invention may be practiced without all of the specific details.

Other advantages and aspects of the inventive subject matter will be readily apparent from the description of the figures that follows.

Suitable System

FIG. 1 is a block diagram illustrating an example of a network environment 100 including a server operating a system for providing application information to a website associated with job listings, consistent with some embodiments. The network environment 100 includes an employment website 110, such as a job aggregation website or employment page within a company website, that communicates via a network with a social networking site 130 and one or more user devices 140 associated with users, such as job candidates with jobs listed and displayed by the employment website 110.

In various example embodiments, one or more portions of the network 120 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, any other type of network, or a combination of two or more such networks. A user device 140 may be any suitable computing device, such as a smart phone, a tablet, a laptop, gaming device, and/or any mobile device or computing device configured to display job listings and receive selections from users of objects displayed by webpages and/or apps.

The employment website 110 may be supported and/or provided by a server that includes a submission system 117, such as a system that provides job listings and facilitates receipt of application materials from job candidates via the website 110. In some examples, the submission system may execute a script 115 associated with the social networking site 130 that causes the website to present a user interface object (e.g., a button or other user-selectable displayed object) that, when selected by a job candidate, causes the website to obtain information associated with a job candidate from the social networking site 130.

In some examples, the employment website may include a listing display system 119 that causes the script 115 or other display components within the employment website to selectively display job listing information, user interface objects, and so on, based on information associated with viewers of job listings pages presented by the employment website 110.

A social networking site is a useful location in which to obtain various types of information associated with a job candidate and/or viewer of a job listings page. Often, a social network or other similar site, such as LinkedIn, Facebook, Google+, Twitter, and so on, stores various types of information associated with members of the site. For example, a friend-based social networking site may store interest information for a member (e.g., information about things a member "likes"), whereas a business-based social networking site may store accomplishment or experience information for a member (e.g., educational or work experience information). Additionally, the social networking site 130 may store a variety of information associated with a member's social graph, such as information identifying other members within the member's social graph.

Returning to FIG. 1, a user device 140 may display, via a user interface 145, one or more pages of job listings to a job candidate, as well as user interface objects proximate to the job listings, for selection by a job candidate. For example, a job candidate may navigate a browser or app supported by the user device 140 to a webpage displayed by website 110, and, in response to viewing a job listing associated with a job the user would like to apply for, select a display user interface object to begin an application process in order to apply for the job.

Once the user interface object is selected, the script 115 communicates with an application system 150 at the social networking site 130, providing identification information for the user, such as information that identifies the user as a member of the social networking site. The application system 150 obtains various types of information (e.g., profile information, social graph information, and so on) associated with the member from a member database 135, and transfers the information to the script 115. Once received, the script 115 may submit the information as an application submission to the submission system and/or may present the information to the user, who may approve and/or provide more information (e.g., a cover letter, other information not provided by the social networking site, and so on). Once approved, the script 115 may package the information and submit the information to the submission system 117 on behalf of the job candidate.

Figure 2A:
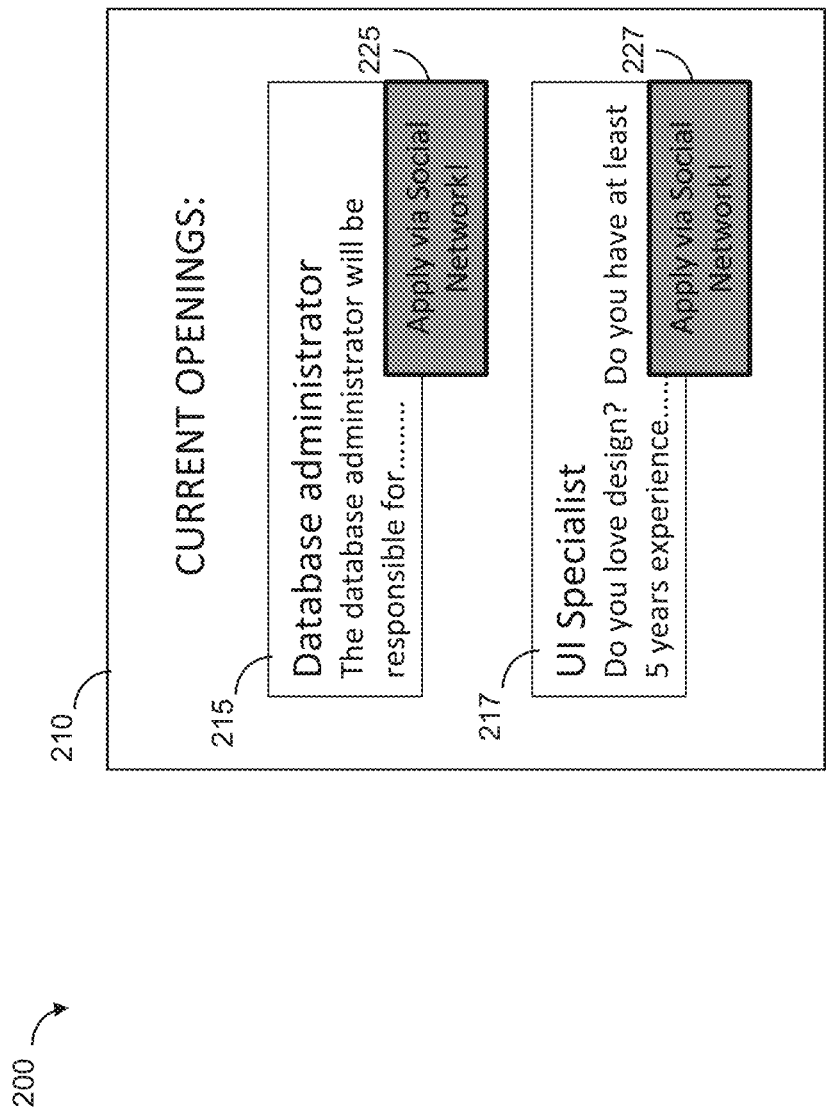
FIG. 2A is a display diagram illustrating a user interface object proximate to a job listing presented by a website, consistent with some embodiments.
Figure 2B:
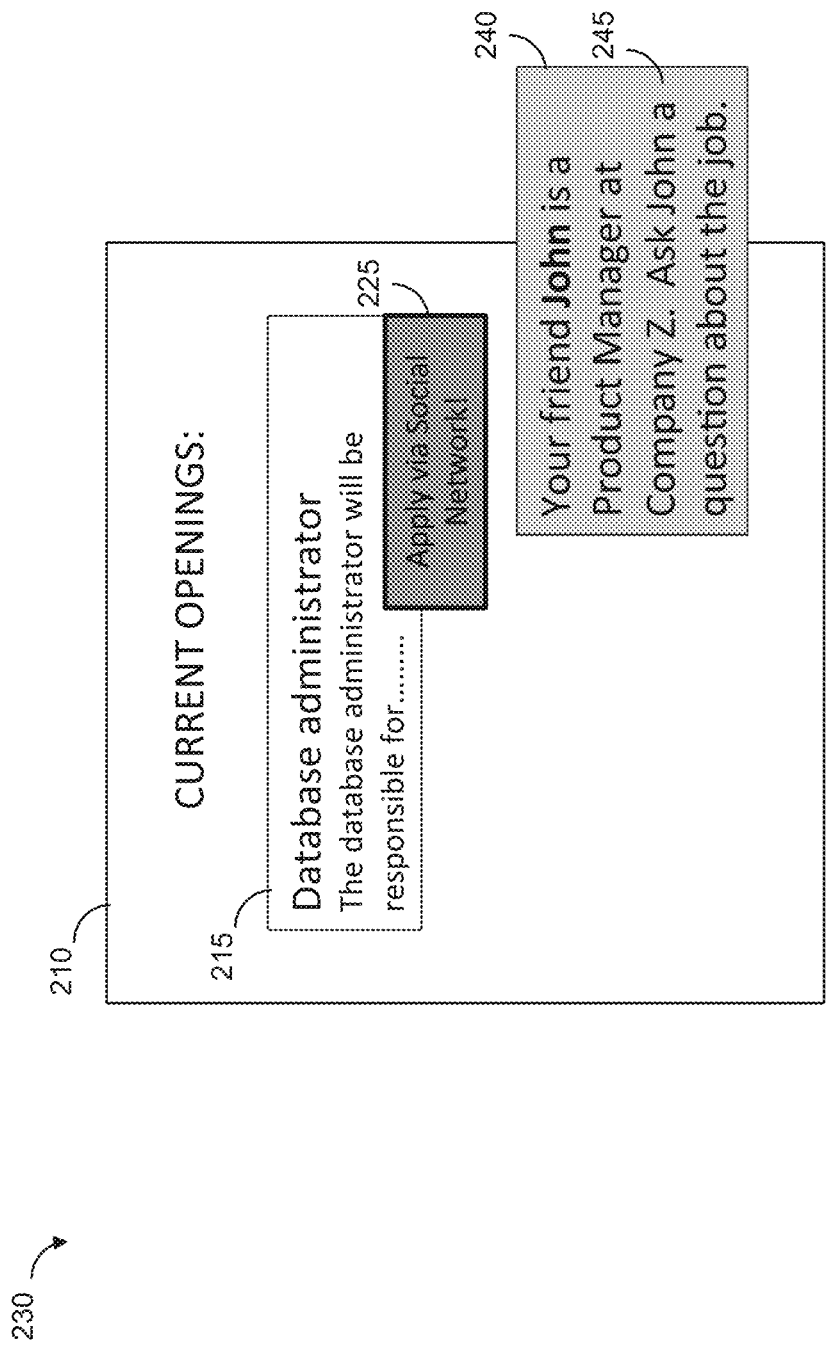
FIG. 2B is a display diagram illustrating displayed social graph information to a job candidate, consistent with some embodiments.

Thus, the systems and methods described herein, may, in some examples, provide a job candidate with a simple and effective process for applying for a job via a website, among other benefits. FIGS. 2A and 2B depict user interface objects and social graph information displayed to job candidates, consistent with some embodiments.

In FIG. 2A, the display diagram 200 depicts a job listings page 210 presented by an employment website, such as website 110. The job listings page 210 presents job listings 215, 217 along with user interface objects 225, 227 proximate to the job listings. As described herein, the user interface objects may be user-selectable buttons or other graphical elements that, when selected by a job candidate, causes the page to obtain information about the job candidate via a social networking site of which the job candidate is a member.

In FIG. 2B, the display diagram 230 depicts the presentation of information to a job candidate in response to a selection of one of the user interface objects 225, 227 depicted in FIG. 2A. For example, in response to the selection of user interface object 225, a new user interface 240 is presented that displays social graph information associated with the job and/or the job candidate that made the selection. In this example, the user interface 240 presents information 245 identifying a connection to the job candidate within the social network that is associated with a company that is sponsoring the job listing 215. The user interface, in addition to presenting information, may direct the job candidate to member profiles, may provide information about a company associated with the job listing 215, may connect the job candidate to one or more members (e.g., "John" in the FIG.) associated with the job listing, and so on.

Of course, one or ordinary skill in the art will appreciate that other information may be presented in response to the selection of user interface objects by job candidates.

Applying for a Job Via a User Interface Object Associated with a Social Network

As described herein, in some example embodiments, the social networking site 130 includes and supports an application system 150, such as a system that enables and/or facilitates the submission of job application materials on behalf of members of the social networking site to submission systems 117 associated with employment websites.

Figure 3:
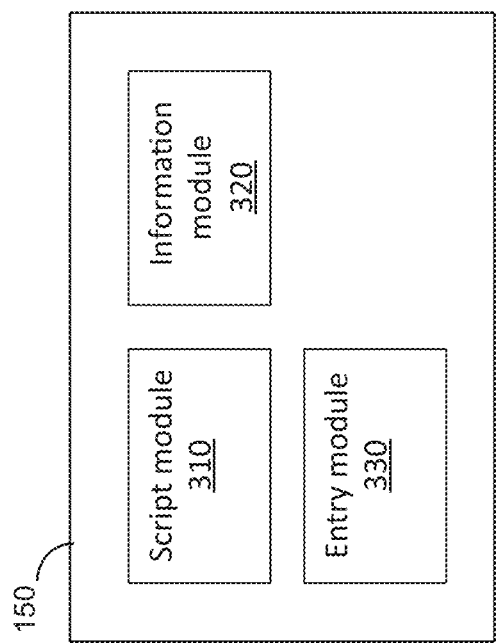
FIG. 3 is a block diagram illustrating modules of the application system, consistent with some embodiments.

FIG. 3 is a block diagram illustrating modules of an application system 150, consistent with some embodiments.

As illustrated in FIG. 3, the application submission system 150 includes a variety of functional modules. One skilled in the art will appreciate that the functional modules are implemented with a combination of software (e.g., executable instructions, or computer code) and hardware (e.g., at least a memory and processor). Accordingly, as used herein, in some embodiments a module is a processor-implemented module and represents a computing device having a processor that is at least temporarily configured and/or programmed by executable instructions stored in memory to perform one or more of the particular functions that are described herein.

Referring to FIG. 3, the application system 150 includes a script module 310, an information module 320, an entry module 330, and other modules not shown in the Figure.

In some examples, the script module 310 is configured and/or programmed to communicate with a script running on an employment site. For example, the script may transfer profile or social graph information associated with a member of the social networking site 130 to a third party site, such as an employment site, that requests information associated with the member via the running script.

In some examples, the information module 320 is configured and/or programmed to locate and/or obtain profile and/or social graph information associated with a member of the social networking site 130, and provide the information, or a link identifying a location (e.g. a pointer to a location within dB 135) in which the information is stored, to the script module 310. Example information obtained and/or identified by the information module 320 may include member profile information (e.g., location information, employment history information, education information, skills information, activities information, interests information, awards information, affiliations information, authenticity score information, and so on), social graph information (information associated with friends or other member associated with the member, groups information, and so on), information associated with references for the member, and so on.

In some examples, the entry module 330 is configured and/or programmed to receive input directly from a job candidate, such as via a user interface presented by the script 115 running at the website 110. For example, the entry module 330 may enable the script to present a user interface configured to receive input associated with questions presented to a job candidate or other text input, configured to receive documents or other files (e.g., cover letters, music files, video files, image files and so on), configure to receive links to webpages associated with the job candidate, and so on.

Furthermore, in some examples, the entry module 330 facilitates the editing and/or other modification of information obtained via the information module 320 that is to be presented to the submission system 117 on behalf of the job candidate. For example, the entry module 330 may enable a job candidate to remove certain information, edit certain information, expand on certain information, re-order the display of certain information, and so on.

Of course, one of ordinary skill in the art will realize that the application system 150 may include other modules now shown in the Figure, such as modules that store and/or analyse information, modules that provide security or identification processes, and so on.

As described herein, the employment website 110 may include and/or support a script that causes a user interface object associated with a social networking site to obtain and submit job application information on behalf of a job candidate, among other things. For example, a suitable script may be configured as follows:

```
<html>
<head>
 <title>Apply with LinkedIn</title>
</head>
<body>
<script type="text/javascript" src="http://platform.linkedin.com/in.js">
 api_key: YOUR_API_KEY
</script>
<script type="IN/Apply"
 data-companyId="1337"
 datajobTitle="Chief Cat Wrangler"
 data-email="your-email-address@your-company.com">
</script>
</body>
        </html>
```

Figure 4:
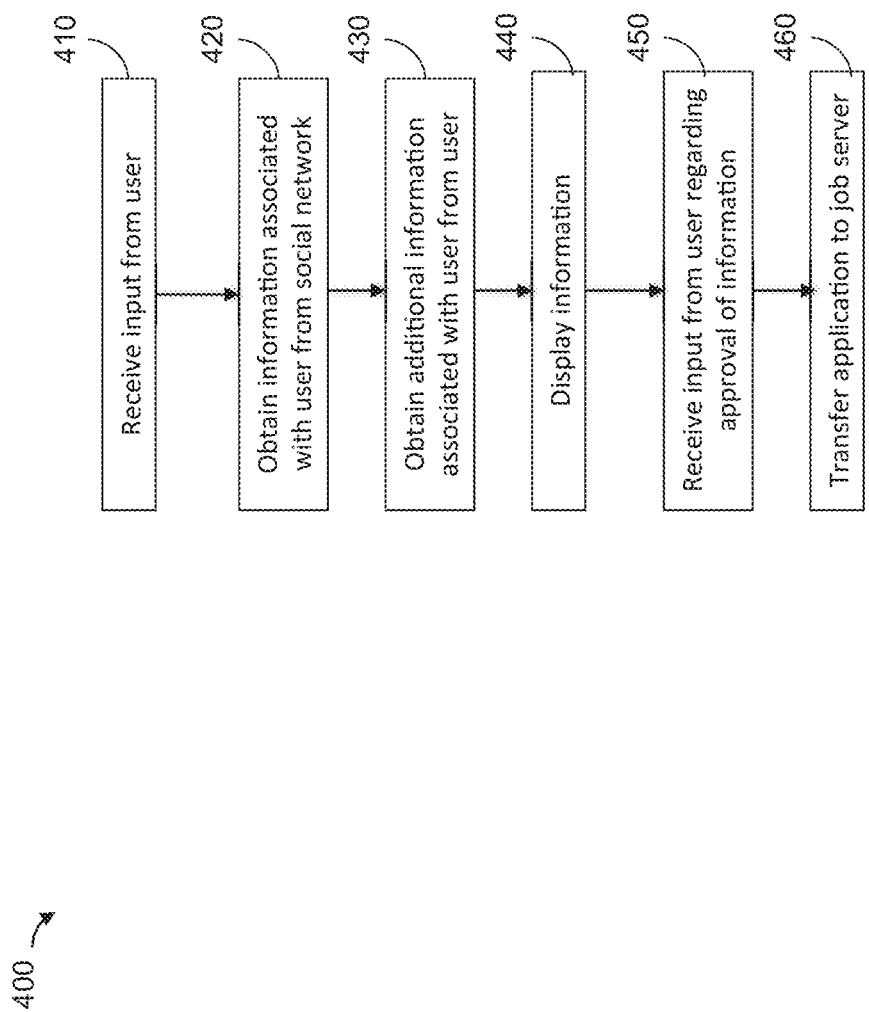
FIG. 4 is a flow diagram illustrating an example method performed by a script for providing application information associated with a job candidate to a website, consistent with some embodiments.

FIG. 4 is a flow diagram illustrating an example method 400 performed by a script for providing application information associated with a job candidate to a website, consistent with some embodiments. In step 410, the script receives input from a user, such as a job candidate. For example, a job candidate may select a user interface object displayed by the script.

In step 420, the script obtains information associated with job candidate via a social network in which the job candidate is a member. For example, the information module 320 of the application system 150 may obtain information from the job candidate's profile data stored in a database 135 at the social networking site 130 that provides the script and that includes the job candidate as a member. Example data and/or information that may be obtained includes:

Profile information, such as information associated with a member's education background (e.g., school information, degree information, grade information, exam information, activity information, organization information, and so on), work history (e.g., company information, job title information, job skills information, job responsibility information, length of employment information, and so on), member information (e.g., residence information, citizenship information, language information, activity and interest information, and so on), and so on;

Social graph information, such as profile information associated with friends, connections, group affiliations, references, and so on of a member; and so on.

In step 430, the script optionally obtains additional information from the job candidate. For example, the script, via the entry module 330, may request for and receive documents or other files, text entry, or other information directly from the job candidate. The script may present a user interface that includes elements that facilitate obtaining such information, such as text entry boxes, upload elements, and so on.

In step 440, the script displays the information to the job candidate. For example, the script may present a user interface that presents the various types of information obtained from the job candidate's social networking site that is to be submitted to the website on behalf of the job candidate.

Optionally, in step 450, the script may receive input from the job candidate associated with modifying and/or approving the submission of the information. For example, the script, via the entry module 330, may receive from the job candidate input associated with editing a portion of the information, deleting a portion of the information, adding information, reorganizing the information, and so on.

In step 460, the script transfers the information to the employment site for submission. For example, the script, via the script module 310, may transfer the information as an application submission package on behalf of the job candidate to the submission system 117 of the employment site 110.

Thus, in some examples, the script presents a user interface object proximate to a job listing, and, upon receiving a selection of the object by a job candidate, obtains information from a social networking site that includes the job candidate as a member and submits the obtained information as an application for the job on behalf of the candidate.

Figure 5:
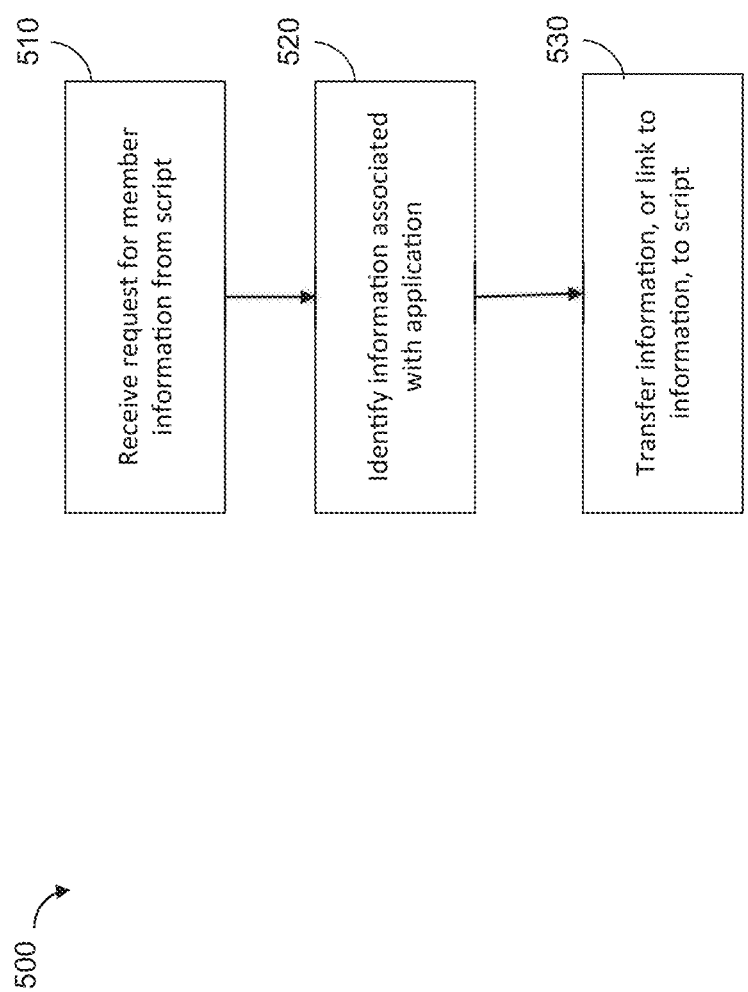
FIG. 5 is a flow diagram illustrating an example method performed by a server associated with a social networking site to provide application information associated with a job candidate to a website, consistent with some embodiments.

As described herein, the script 115 provided and/or supported by an employment website is, in some examples, associated with a social networking site 130 that stores data for members of the site and provides information to the script to facilitate the submission of application materials for members, among other things. FIG. 5 is a flow diagram illustrating an example method 500 performed by a server associated with a social networking site to provide application information associated with a job candidate to a website, consistent with some embodiments.

In step 510, the application system receives a request for information from a script running on an employment website. For example, the script module 310 receives a request, such as an API call via an API, which includes information identifying a member of the social networking site. The request may also include other information, such as information identifying the employment site, information identifying the format in which to return information to the script, and so on.

In some examples, an employment site may request submissions to be emailed to the site, and utilize an email mechanism that provides a submission email address along with the request (e.g., via a parameter such as data-email="resumes@mycompany.com").

In some examples, an employment site may request submissions to be in a scheme such that the data can be processed and stored in various database, and utilize an HTTP POST mechanism that obtains the application information in XML or JSON formats (e.g., via a parameter such as data-url="http://mycompany.com/rest/jobposting"). Of course, one of ordinary skill in the art will realize that other submission schema may be used.

Additionally, in some examples, the request may include parameters that identify certain types of information to be obtained. For example, the request employment site may request to only receive employment information for certain job postings, and may request all profile information for other job postings.

In step 520, the application system identifies and/or located the requested information. For example, the information module 320 may locate the requested information via a member database 155 that stores information associated with members of the social networking site 130. As described herein, the information module 320 may locate profile information, social graph information, reference information and/or other information associated with a member and stored by the social networking site 130.

In step 530, the application system transfers the located information, or a link to the located information, to the script. For example, the script module 310 may transfer a link such as <src=http://api.linkedin.com/v1/people/url=<usernameprofile> to the script.

Thus, in some examples, the social networking site 130, via the application system 150, receives request for information from scripts running on employment sites, and provides the information in any requested form, among other things.

Displaying Job Listings Based on Knowledge of a Viewer of the Listings

Figure 6:
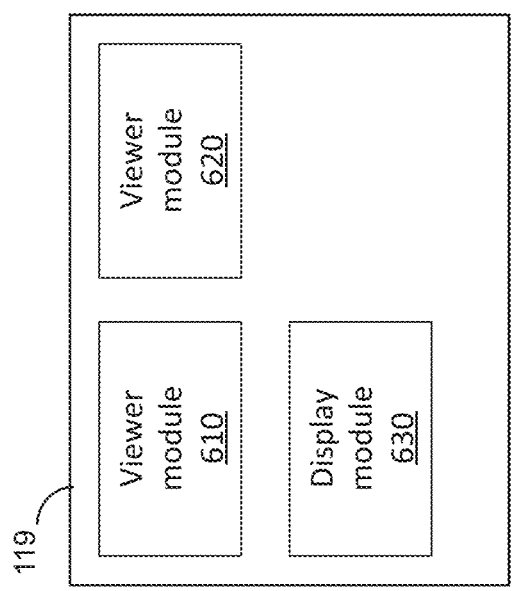
FIG. 6 is a block diagram illustrating modules of the listing display system, consistent with some embodiments.

As described herein, in some examples, an employment site, a script facilitating the display of user interface objects proximate to job listings, and/or another resource associated with displaying job listings to viewers of websites may modify the display of job listings based on information associated with a viewer of a job listings page, such as social network profile information attributed to the viewer. FIG. 6 is a block diagram illustrating modules of the listing display system 119, consistent with some embodiments.

As illustrated in FIG. 6, the listing display system 119 includes a variety of functional modules. One skilled in the art will appreciate that the functional modules are implemented with a combination of software (e.g., executable instructions, or computer code) and hardware (e.g., at least a memory and processor). Accordingly, as used herein, in some embodiments a module is a processor-implemented module and represents a computing device having a processor that is at least temporarily configured and/or programmed by executable instructions stored in memory to perform one or more of the particular functions that are described herein.

Referring to FIG. 6, the listing display system 119 includes a viewer module 610, a match module 620, and a display module 630. In some examples, the viewer module 610 is configured and/or programmed to identify, determine, and/or otherwise attribute information to a viewer of a website, such as a viewer of a job listings website associated with a company or job listings website. For example, the viewer module 610 may identify social network profile information, social graph information, and so on, as certain information to be assigned to a viewer of a website.

In some examples, the match module 620 is configured and/or programmed to match information associated with a viewer to information associated with a job listing or job listings. For example, the matching may identify a viewer's education or employment history from social network information associated with a viewer, such as degree information, companies the viewer has worked for, work experience information, education information, skills information, information associated with connections within the viewer's social graph, and so on, to keywords within a title, description, or tag associated with a job listing.

In some examples, the application system 150 may include a display module 630 configured and/or programmed to display job listings via a website based on information associated with a viewer of the website. For example, the display module 630 may display job listings that include attribute information matching information associated with the viewer, and not display job listings that include attribute information that does not match information associated with the viewer. Thus, in some examples, the display module 630 may cause a website to display first set of job listings to a first viewer of the website, and a second, different, set of job listings to a second viewer of the website, among other things.

FIG. 7 is a flow diagram illustrating an example method 700 for displaying job listings via a website, consistent with some embodiments. In step 710, the employment site determines attribute information for a viewer of a website. For example, the employment site, via the viewer module 610, may identify or locate information via an application system 150 of a social networking site 130 that includes the viewer as a member. Example attribute information may include profile information, social graph information, and so on.

In step 720, the employment site matches viewer attribute information to information associated with a job listing or job listings. For example, the employment site, via the match module 620, may match information describing a viewers education or employment history, such as degree information, companies the viewer has worked for, and so on, to keywords within a title, description, or tag associated with a job listing.

In step 730, the employment site presents job listings via a job listings page based on the match. For example, the employment site, via the display module 630, may present job listings that include words or phrases that match or are associated with attributes assigned to the viewer, and not present job listings that do not match.

For example, the employment site may present a complete set of job listings to a generic group of viewers of the website, a first set of job listings that is a first subset of the complete set of job listings to a first identified viewer of the website, and a second set of job listings that is a second, different, subset of the complete set of job listings to a second identified viewer of the website.

In some examples, the employment site, or a script that presents user interface objects proximate to job listings to facilitate a job candidate applying for a job associated with a job listing, may selectively display the user interface objects based on information associated with a viewer of the job listing. For example, when presenting a job listing, the script may determine that the member of a social networking site providing the script is qualified for the job associated with the listing, and present a user interface object to facilitate submission of an application.

Figure 8A:
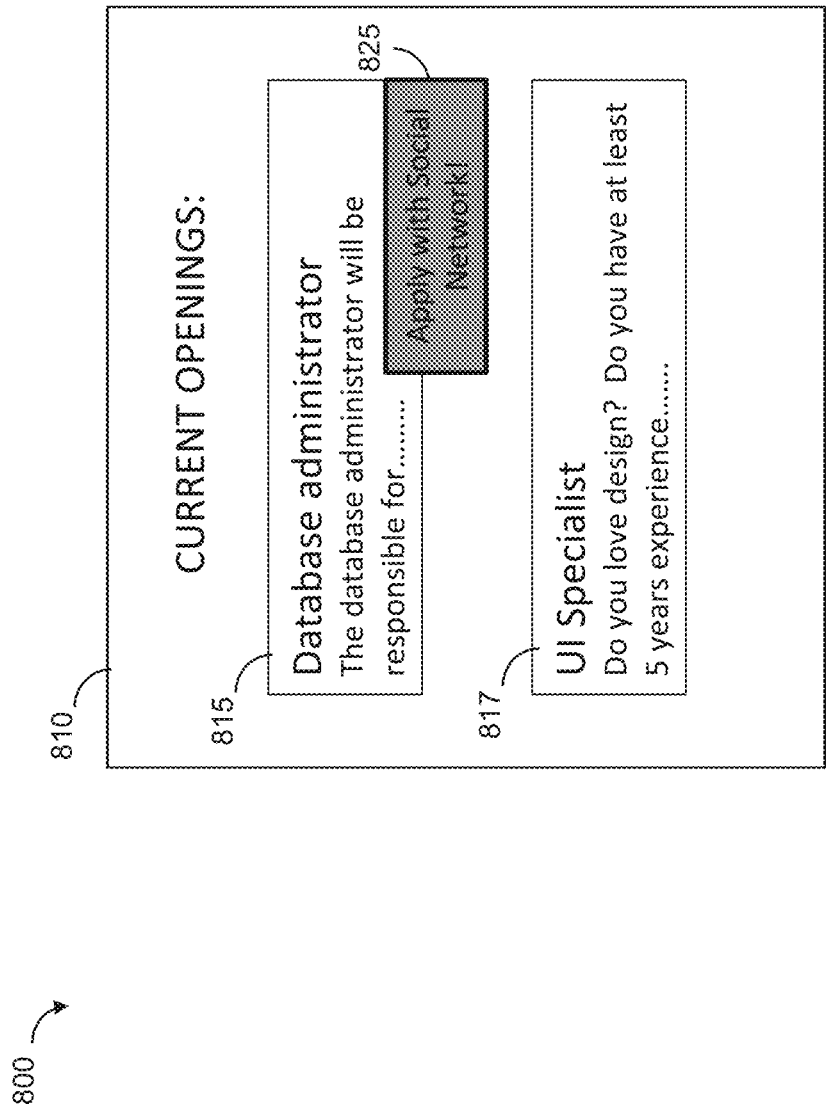
FIG. 8A is a display diagram illustrating a display of user interface objects via a website based on a viewer of the website, consistent with some embodiments.

For example, FIG. 8A depicts a display 800 of user interface objects via a website based on a viewer of the website, consistent with some embodiments. Display 800 is similar to display 200, depicting a job listing 815 for a database administrator, and a job listing 825 for a UI specialist. However, instead of displaying user interface objects proximate to both listings, a script configured to display the objects only displays user interface object 817 proximate to the database administrator job listing 815, because the script determined that profile information associated with the viewer indicated previous experience as a database administrator.

As another example, FIG. 8B depicts a display of a job listings page 830 that presents a first set of job listings 842-846 to a first viewer (Viewer X), and a second set of job listings 852-856 to a second viewer (Viewer Y). In the example, when the listing display system 119 described herein identifies a first viewer as having work experience above a certain threshold (e.g., experience as an engineering team leader), the system causes the page 830 to present a first set of job listings (e.g., Product Manager 842, VP of Engineering 844, and Team Lead 846) that are associated with the first viewer's experience information. However, when a second viewer having less or different work experience navigates to the page, the system causes the page 830 to present a second, different, set of job listings (e.g., Product Manager 852, Product Developer II 854, Product Developer I 856), that are associated with (and possibly better suited to) the second viewer's experience information.

Thus, in some examples, an employment website may perform a rule-based process in order to determine how to present job listings to a viewer of a job listings page. For example, the employment website may perform the following rule-based processes:

Display a user interface object proximate to a job listing when a viewer is associated with information that matches at least one word or phrase within a title of a job listing;

Display a user interface object proximate to a job listing when a viewer is associated with information that matches at least one word or phrase within a description of a job listing;

Display the job listing when a highest level of education associated with a viewer is greater than or equal to an education requirement associated with the job listing;

Display the job listing when a number of years of experience associated with a viewer is greater than or equal to an experience requirement associated with the job listing;

Display a modified job listing when a residence associated with a viewer does not match a location associated with the job listing;

Display a modified job listing when an experience level of the viewer does not match an experience level associated with the job listing;

Select a certain job listing to display for a company based on an education level and/or experience level associated with the viewer; and so on.

Thus, in some examples, an employment website may selectively display job listings and/or user interface objects to viewers of a jobs page based on the type of viewer that is viewing the jobs pages, enabling the employment website to target job listings to potential candidates that may be deemed to be qualified for the listed jobs, among other things. Furthermore, selectively displaying job listings may enable a company or other entity associated with the job listings to avoid receiving inquiries and job applications from potential candidates are not deemed to be qualified for associated jobs, among other benefits.

CONCLUSION

Some example embodiments of the technology, therefore, enable an employment site to receive application submissions on behalf of job candidates based on information obtained from social networking sites that include the job candidates as members, among other benefits.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules, engines, objects or devices that operate to perform one or more operations or functions. The modules, engines, objects and devices referred to herein may, in some example embodiments, comprise processor-implemented modules, engines, objects and/or devices.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

FIG. 9 is a block diagram of a machine in the form of a computer system or computing device within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment. In some embodiments, the machine will be a desktop computer, or server computer, however, in alternative embodiments, the machine may be a tablet computer, a mobile phone, a personal digital assistant, a personal audio or video player, a global positioning device, a set-top box, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device 1516 (e.g., drive unit), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:

receiving a request for information from a script executing at an employment site, the request triggered by a selection, by a member of a social network service, of a first user interface object presented proximately with a job listing in a user interface of a device of the member based on a determination by the script that the member satisfies a qualification of a job associated with the job listing, the first user interface object not presented proximately with one or more additional job listings in the user interface based on a determination by the script that the member does not satisfy one or more additional qualifications of one or more additional jobs associated with the one or more additional job listings, the request including one or more parameters specifying selected types of information about the member to obtain for the job listing and one or more parameters identifying a data schema for the selected types of the information, the data schema being supported by a least one database of a submission system included in a server of the employment site, the selected types of the information being different from selected types of information for at least one of the one or more additional job listings;

in response to receiving the request for information, performing the following operations:

retrieving the selected types of the information from a member database associated with the social network service, the selected types of the information corresponding to the member and including at least one of profile information or social graph information; and communicating the selected types of the information for presenting, by the script executing at the employment site, in the user interface, the presenting including enabling editing of the selected types of the information by the member, the enabling of the editing comprising enabling removing of a subset of the information, modifying of the subset of the information, reordering of the subset of the information, or providing of additional information.

2. The method of claim 1, wherein the selected types of the information include reference information.

3. The method of claim 1, wherein the additional information includes a document corresponding to a cover letter, music file, video file, or image file.

4. The method of claim 1, wherein the request includes one or more parameters specifying a return format, wherein the return format includes a link that identifies a location in which at least one of the selected types of information is stored.

5. The method of claim 1, wherein the receiving of the selection of the first user interface object includes receiving the selection via a touch screen display of the device that presents the user interface object.

6. The method of claim 1, wherein the request includes at least one parameter identifying the employment site.

7. The method of claim 1, wherein, alternatively, based on the job listing, the selected types of information include only employment information or all profile information.

8. The method of claim 1, wherein a second user interface object is presented proximately with the job listing, the second user interface object including a connection of the member having a position at a company to which the job listing pertains and wherein the second user interface object includes a user-selectable element for asking the connection a question about the job associated with the job listing.

9. The method of claim 1, wherein a second user interface object is presented proximately with the job listing, the second user interface object including a connection of the member having a position at a company to which the job listing pertains and wherein the second user interface object does not include any other connections of the member.

10. The method of claim 1, wherein the selected types of information for the first job listing include all of the profile information and the selected types of information for the second job listing includes a subset of the profile information.

11. The method of claim 10, wherein the subset of the profile information includes employment information.

12. The method of claim 1, wherein the profile information includes one or more of location information, employment history information, education information, skills information, activities information, interests information, awards information, affiliations information, or authenticity score information.

13. The method of claim 1, wherein the social graph information includes one or more of profile information associated with friends, connections, group affiliations, or references of the member.

14. The method of claim 1, wherein the data schema allows a Hypertext Transfer Protocol POST mechanism to be utilized to obtain the selected types of information in Extensible Markup Language of JavaScript Object Notation formats.

15. A non-transitory computer-readable storage medium having a set of instructions that cause one or more processors of a social network service to perform operations, the operations comprising:

receiving a request for information from a script executing at an employment site, the request triggered by a selection, by a member of the social networking service, of a first user interface object presented proximately with a job listing in a user interface of a device of the member based on a determination by the script that the member satisfies a qualification of a job associated with the job listing, the first user interface object not presented proximately with one or more additional job listings in the user interface based on a determination by the script that the member does not satisfy one or more additional qualifications of one or more additional jobs associated with the one or more additional job listings, the request including one or more parameters specifying selected types of information about the member to obtain for the job listing and one or more parameters identifying a data schema for the selected types of the information, the data schema being supported by a least one database of a submission system included in a server of the employment site, the selected types of the information being different from selected types of information for at least one of the one or more additional job listings;

in response to receiving the request for information, performing the following operations:

retrieving the selected types of the information from a member database associated with the social network service, the selected types of the information corresponding to the member and including at least one of profile information or social graph information; and communicating the selected types of the information for presenting, by the script executing at the employment site, in the user interface, the presenting including enabling editing of the selected types of the information by the member, the enabling of the editing comprising enabling removing of a subset of the information, modifying of the subset of the information, reordering of the subset of the information, or providing of additional information.

16. A system comprising:

one or more computer processors;

one or more computer memories comprising a set of instructions, the set of instructions configuring the one or more computer processors to perform operations comprising:

receiving a request for information from a script executing at an employment site, the request triggered by a selection, by a member of a social networking service, of a first user interface object presented proximately with a job listing in a user interface of a device of the member based on a determination by the script that the member satisfies a qualification of a job associated with the job listing, the first user interface object not presented proximately with one or more additional job listings in the user interface based on a determination by the script that the member does not satisfy one or more additional qualifications of one or more additional jobs associated with the one or more additional job listings, the request including one or more parameters specifying selected types of information about the member to obtain for the job listing and one or more parameters identifying a data schema for the selected types of the information, the data schema being supported by a least one database of a submission system included in a server of the employment site, the selected types of the information being different from selected types of information for at least one of the one or more additional job listings;

in response to receiving the request for information, performing the following operations:

retrieving the selected types of the information from a member database associated with the social network service, the selected types of the information corresponding to the member and including at least one of profile information or social graph information; and communicating the selected types of the information for presenting, by the script executing at the employment site, in the user interface, the presenting including enabling editing of the selected types of the information by the member, the enabling of the editing comprising enabling removing of a subset of the information, modifying of the subset of the information, reordering of the subset of the information, or providing of additional information.

17. The system of claim 16, wherein the selected types of the information include accomplishment or experience information that includes work experience and educational experience information.

18. The system of claim 16, wherein the selected types of the information include reference information for the member of the social network service.

19. The system of claim 16, wherein the user interface object is presented via an application supported by the device.

20. The system of claim 16, wherein the device is a smart phone or tablet.

* * * * *